(12) United States Patent
Thibault et al.

(10) Patent No.: US 8,175,115 B2
(45) Date of Patent: May 8, 2012

(54) METHOD AND SYSTEM FOR ITERATIVE RECONSTRUCTION

(75) Inventors: Jean-Baptiste Daniel Marie Thibault, Milwaukee, WI (US); Jiang Hsieh, Brookfield, WI (US); Bruno Kristiaan Bernard De Man, Clifton Park, NY (US); Samit Kumar Basu, Niskayuna, NY (US); Zhou Yu, West Lafayette, IN (US); Charles Addison Bouman, West Lafayette, IN (US); Ken David Sauer, South Bend, IN (US)

(73) Assignees: General Electric Company, Schenectady, NY (US); Purdue Research Foundation, West Lafayette, IN (US); The University of Notre Dame du Lac, Notre Dame, IN (US)

( * ) Notice: Subject to any disclaimer, the term of this patent is extended or adjusted under 35 U.S.C. 154(b) by 1573 days.

(21) Appl. No.: 11/561,114

(22) Filed: Nov. 17, 2006

(65) Prior Publication Data

US 2008/0118020 A1    May 22, 2008

(51) Int. Cl.
*H04J 3/16* (2006.01)
(52) U.S. Cl. ................................. 370/469; 382/8; 382/4
(58) Field of Classification Search .................. 370/469, 370/470, 471, 473, 401, 395.5; 378/8, 4, 378/901; 382/131, 128
See application file for complete search history.

(56) References Cited

U.S. PATENT DOCUMENTS

| | | | |
|---|---|---|---|
| 5,038,390 A | 8/1991 | Chandran | |
| 5,239,457 A | 8/1993 | Steidle et al. | |
| 5,293,312 A | 3/1994 | Waggener | |
| 5,331,553 A | 7/1994 | Muehllehner et al. | |
| 5,966,422 A | 10/1999 | Dafni et al. | |
| 6,766,048 B1 | 7/2004 | Launay et al. | |
| 6,768,782 B1 * | 7/2004 | Hsieh et al. | 378/8 |
| 7,057,503 B2 | 6/2006 | Watson | |
| 7,068,849 B2 | 6/2006 | Zandi et al. | |
| 7,119,731 B2 | 10/2006 | Fleisher | |
| 7,132,836 B2 | 11/2006 | Peters et al. | |
| 7,885,371 B2 * | 2/2011 | Thibault et al. | 378/4 |
| 2001/0000710 A1 | 5/2001 | Queiroz et al. | |
| 2003/0005140 A1 | 1/2003 | Dekel et al. | |
| 2003/0095135 A1 | 5/2003 | Kaasila et al. | |
| 2004/0068167 A1 | 4/2004 | Hsieh et al. | |
| 2004/0122882 A1 | 6/2004 | Zakharov et al. | |
| 2005/0135664 A1 | 6/2005 | Kaufhold et al. | |
| 2005/0185320 A1 | 8/2005 | Ueda et al. | |
| 2006/0072801 A1 | 4/2006 | Deman et al. | |

OTHER PUBLICATIONS

PCT International Search Report dated Jun. 17, 2008; PCT/US 07/84526; 13 pages.

* cited by examiner

*Primary Examiner* — Chi Pham
*Assistant Examiner* — Alexander Boakye
(74) *Attorney, Agent, or Firm* — Armstrong Teasdale LLP (57) ABSTRACT

A method for reconstructing an image of an object, the image comprising a plurality of image elements, is disclosed. The method includes accessing image data associated with the plurality of image elements, applying a first algorithm to the plurality of image elements, selecting a spatially non-homogenous set of the plurality of image elements, and applying an iterative algorithm to the set of image elements to reduce an amount of time necessary for reconstructing the image, or to improve an image quality at a fixed computation time, or both.

23 Claims, 6 Drawing Sheets

METHOD AND SYSTEM FOR ITERATIVE RECONSTRUCTION

BACKGROUND OF THE INVENTION

The present disclosure relates generally to imaging systems and particularly to systems and methods of reconstructing an image using iterative techniques.

Traditionally, images have been reconstructed from Computed Tomography (CT) data using so-called direct reconstruction algorithms such as filtered back projection (FBP) or convolution back projection (CBP). Recently, iterative reconstruction (IR) algorithms have received renewed attention for the reconstruction of CT images. The major advantage of IR algorithms is that they can more accurately model the measurements obtained from real CT systems. This is particularly true for helical CT systems with multi-slice detectors because these systems produce projection measurements that pass obliquely through the 2-D reconstructed image planes. By more accurately modeling these projections, IR algorithms can produce reconstructions with higher quality, lower noise, and fewer artifacts.

For example, consider a helical scan CT system. The 3-D volume to be reconstructed can be represented by an array of N discrete voxels $x_i$ where i is the index of the voxel 3-D position. The value $x_i$ may specify the unknown density of the voxel. Furthermore, let $x=[x_1, x_2, \ldots x_N]$ be a vector containing the unknown density of each voxel in the reconstruction. In this case, x represents the full 3-D reconstruction volume. During the CT scanning process, projection data are measured for M different projection lines through the object. The different projection lines are typically measured for a wide variety of positions and angles through the object. The value of the jth projection through the object is denoted by $y_j$ and the vector of all measurements is denoted by $$y=[y_1, y_2, \ldots, y_M].$$

The objective of IR algorithms is to determine the unknown value of x by searching for the value of the vector x that best matches the measured data. Typically, this is done by minimizing a cost function of the form:

$$\hat{x} = \mathrm{argmin}_x \left\{ \sum_{m=0}^{M} w_m |y_m - F_m(x)|^2 \right\} \quad \text{equation-1}$$

where $\hat{x}$ is the value of the variable x which achieves the minimum of the function and $w_m$ is a weighting factor, which can be based upon statistical properties of the algorithm. This cost function can be minimized in a variety of manners using optimization methods such as iterative coordinate descent, expectation maximization, conjugate gradient, a gradient-based method, or any number of alternative techniques.

In practice, the solution to equation-1 often includes greater levels of noise than desired. This noisiness may result when there are too few measurements, when the quality of the measurements is poor, or When the available projection angles and locations do not give sufficient information about x to properly reconstruct it. This problem can be addressed by adding an additional stabilizing function S(x) to the cost function being minimized. This results in the regularized inverse $$\hat{x} = \mathrm{argmin}_x \left\{ \sum_{m=0}^{M} w_m |y_m - F_m(x)|^2 + S(x) \right\} \quad \text{equation-2}$$

Typically, the function S(x) is chosen to be a quadratic function with the form $$S(x)=x^t H x$$

where H is a symmetric and positive definite or positive semi-definite matrix. The particular choice of the functional S(x) can have a substantial effect on the quality of reconstructions produced by IR algorithms.

A major challenge of IR is the computation time and computational resources required to complete a reconstruction. Because IR has been studied for other types of reconstruction problems, a variety of methods that have been proposed for computing the solution to equation (1). Some of these methods include ordered subset expectation maximization (OSEM), preconditioned conjugate gradient (PCG), and iterative coordinate descent (ICD). All of these methods perform the minimization required in equation (1) by iteratively computing a forward projection $F_m(x)$, determining the error between the forward projections and the measured projections $y_m$, adjusting the values in the image x, and then repeating this process until the result is sufficiently close to the desired minimum.

Of the available IR reconstruction methods, ICD has been found to provide convergence rapidly, or with few required iterations. The ICD algorithm differs from the others in that it changes or updates a single voxel at a time, and sequentially visits all voxels in the reconstruction volume. An N-dimensional optimization problem is reduced to a sequence of one-dimensional greedy optimizations, where at each step the largest amount of change in a voxel which minimizes the 1D cost function is selected as the step to descend the global objective function. In the conventional ICD algorithm, every voxel is updated exactly once for each iteration of the algorithm. The order of voxel selection for 1D updates is important to reduce the correlation between successive updates and take as large a step to descend the global cost function as possible with each voxel update. For instance, it is generally known in the art that randomized voxel selection for ICD updates results in faster convergence than simple raster scan ordering.

While the convergence of ICD is rapid in terms of the number of required iterations, the computational requirements of 3D ICD for helical multi-slice CT are still very demanding. Various methods have been investigated for reducing the computational requirements to ICD make faster. One method is to focus computations upon a particular region-of-interest (ROI). Another method is to perform reconstructions at different resolutions, typically going from a coarse resolution representation of the reconstructed image to finer resolutions reconstructions. While these methods are effective in certain applications, they have disadvantages. ROI reconstruction only produces a reconstruction in a limited spatial region. If it is necessary to view the reconstruction in a larger area, then ROI reconstruction is unsatisfactory. Multi-resolution algorithms can speed reconstruction however they lead to complex algorithms, which can be difficult to implement and maintain.

Accordingly, there is a need in the art for an iterative reconstruction arrangement that overcomes these drawbacks.

BRIEF DESCRIPTION OF THE INVENTION

An embodiment of the invention provides a method for reconstructing an image of an object, the image comprising a plurality of image elements. The method includes accessing image data associated with the plurality of image elements, applying a first algorithm to the plurality of image elements, selecting a spatially non-homogenous set of the plurality of image elements, and applying an iterative algorithm to the set of image elements to reduce an amount of time necessary for reconstructing the image, or to improve an image quality at a fixed computation time, or both.

Another embodiment of the invention includes an imaging system. The imaging system includes a controller, a source in signal communication with the controller, the source generating imaging energy in response to a control signal from the controller, and a detector array configured to receive the imaging energy and make available image data in response thereto. The imaging system also includes a translating table configured for receiving an object thereon and operable to translate in relation to the source and the detector array and an image reconstructor electrically coupled to the detector array and the controller. The image reconstructor is responsive to the controller and receptive of the image data to reconstruct an image comprising a plurality of image elements via a technique comprising the application of a first algorithm to the plurality of image elements, selection of a spatially non-homogenous set of the plurality of image elements, and application of an iterative algorithm to the set of image elements to reduce an amount of time necessary for reconstructing the image.

BRIEF DESCRIPTION OF THE DRAWINGS

Referring to the exemplary drawings wherein like elements are numbered alike in the accompanying Figures.

DETAILED DESCRIPTION OF THE INVENTION

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated otherwise.

For the purposes disclosed herein, the term "image space" refers to a set of vectors arranged in an array. The array may be of any number of dimensions, such as two-dimensional, three-dimensional, four-dimensional, for example. An example of an image space is a set of all possible images that may be represented on a lattice of a given dimension. A single element (vector) of the set of the image space may be viewed on a visual display apparatus to allow a user to gain information of the interior of a scanned object.

For the purposes disclosed herein, the term "forward model" refers to a description of the transformation from the image space of a scanned object to the projection space for a scanned object, as modeled after the operation of the CT imaging system. The operation of the forward model on an image vector is referred to as "forward projection."

For the purposes disclosed herein, the term "computed tomography model" refers to a mathematical description of the relation between a vector in the image space and a vector in the projection space. A computed tomography model includes a forward model and a cost function chosen to evaluate the closeness of a match between a projection vector and a forward projection of an image vector by a forward model.

For the purposes disclosed herein, the term "projection space" refers to a set of vectors of integral X-ray attenuation values. The vectors that make up a projection space may include data from an X-ray CT scanner. Also, the vectors that make up a projection space may be forward projections of vectors from an image space.

For the purposes disclosed herein, the term "filtered back-projection" refers to a technique of reconstructing images from projection data by processing data in the projection space, and forming the value of each element in the image space as a linear combination of values from processed data, those values taken from projection space points to which the given image element contributes in forward projection.

For the purposes disclosed herein, the term "image element" shall refer to an element of an object within the image space array. For example, an image element may include an image pixel or picture element that can correspond to a single voxel or volume element in a 3-D reconstruction.

DESCRIPTION

An embodiment of the invention is based on the principle that it is advantageous for the iterative optimization algorithm to focus on those regions in the image that correspond to the largest difference with the fully converged image in order to achieve this result faster. It will be appreciated that because the converged image is the desired final outcome, it is therefore not available to make those decisions during reconstruction.

An embodiment of the invention provides an improvement on the technique of image element selection for ICD to achieve significantly faster convergence, thereby reducing computation time. In an embodiment, non-homogeneous, or spatially non-uniform iterations may be performed in a variety of ways using a variety of IR algorithms. In an embodiment, a key idea is to select the image elements that are furthest from convergence and to focus computation on those elements to speed convergence. In an embodiment of the invention, this can be done by varying the process to alternate between non-homogeneous and homogeneous iterations. In another embodiment, by varying the method used to implement the non-homogeneous sub-iterations. In another embodiment, by varying the formula used to compute an image element update criteria, also herein referred to as a pixel update criteria, (PUC). In another embodiment by adapting the method to other IR algorithms such as OSEM and PCG.

In an embodiment, the homogeneous (spatially uniform) algorithm, also herein referred to as a first algorithm, will be applied to all image elements once and once only per iteration. In an embodiment the non-homogeneous algorithm, also herein referred to as an iterative algorithm, will be applied more frequently at some element locations, and less frequently at some other element locations, as determined by the PUC.

Figure 1:
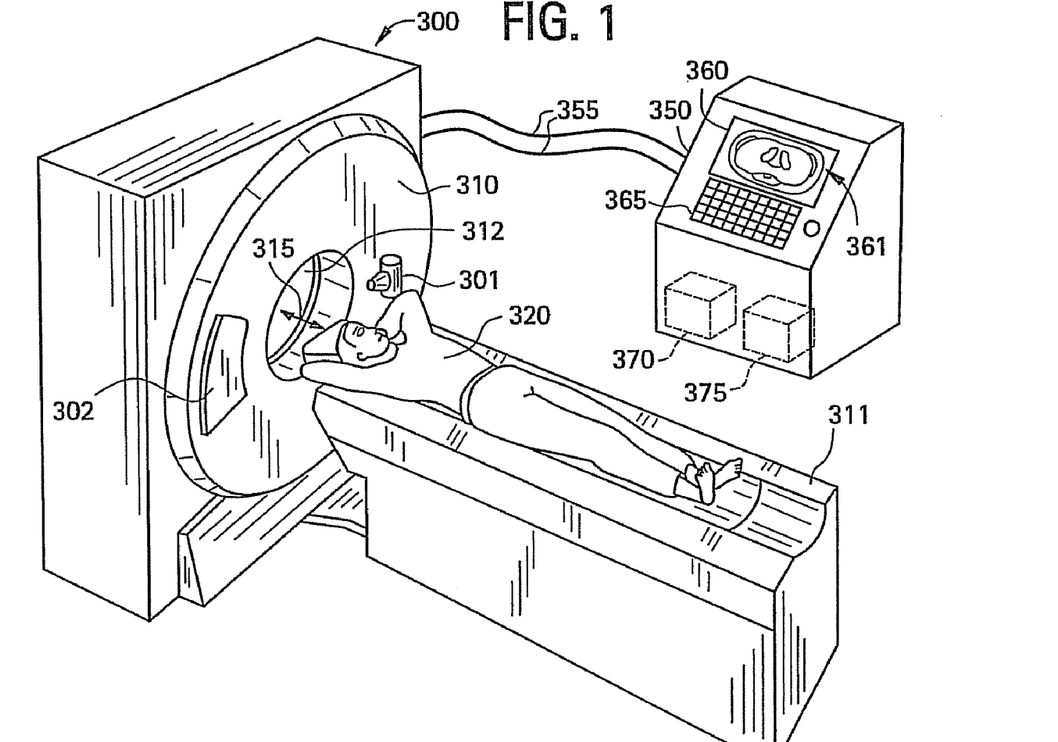
FIG. 1 depicts a depicts a top perspective view of an exemplary CT Imaging system in accordance with an embodiment of the invention.
Figure 2:
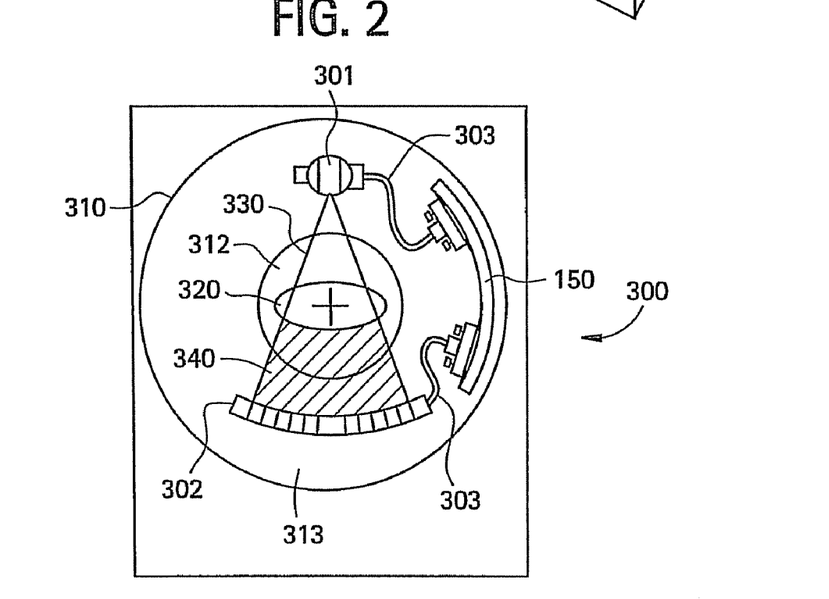
FIG. 2 depicts a schematic end view of an exemplary CT Imaging system in accordance with an embodiment of the invention.

FIGS. 1 and 2 depict an embodiment of an imaging system 300, such as a CT imaging system, including a gantry 310 having a housing 313, a source 301, such as an x-ray source, a detector array 302, a translating table 311 having an object 320, such as a patient, and an object cavity 312. The source 301 and the detector array 302 are mounted within the housing 313, opposingly disposed so as to be separated by the object cavity 312. In an exemplary embodiment, the object 320 is disposed upon the object support structure 311, which is operable to translate in relation to the source 301 and the detector array 302 along a helical, or Z-axis 315 within the object cavity 312. The source 301 projects an x-ray beam 330 toward the radiation detector array 302 so as to pass through the object 320. After passing through and becoming attenuated by the object 320, the attenuated x-ray beam 340 is received by the detector array 302. The detector array 302 receives an attenuated x-ray beam 340 and produces an electrical signal responsive to the intensity of the attenuated x-ray beam 340.

Image data is obtained by rotating the gantry 310 around the object 320 during a scan. The source 301, the detector array 302, and a circuit board 150 are disposed within the housing 313, so as to allow the x-ray source 301 and the radiation detector array 302 to rotate about an axis of rotation coincident with the helical axis 315. The source 301 and the detector array 302 rotate with the gantry 310 around the support structure 311 when the support structure 311 is disposed within the object cavity 312. The source 301 and the detector array 302 are in power and signal communication with the circuit board 150 via a set of cables 303. The circuit board 150 is in power and signal communication with a console 350 via cable 355. The console 350 includes a controller 370 in signal communication with an image reconstructor 375. The image reconstructor 375 is responsive to the controller 370 and receptive of the image data, including a plurality of image elements, to reconstruct an image 361 of the object 320 via a technique comprising the application of the first algorithm to the plurality of image elements, selection of a spatially non-homogeneous set of the plurality of image elements, and application of an iterative algorithm to the set of image elements to reduce an amount of time necessary for reconstructing the image 361. A display device 360 is in signal communication with the controller 370, and is configured to display the image 361. An interface device 365 is in signal communication with the controller 370, and receptive of operator selection of operation parameters of the system 300.

While an embodiment of the invention has been described as a CT imaging system, it will be appreciated that the scope of the invention is not so limited, and that the invention will also apply to iterative reconstruction methods for other imaging systems, such as a helical scan multi-slice CT imaging system, a radiography imaging system, a magnetic resonance imaging (MRI) system, a positron emission tomography (PET) imaging system, and a single photon emission computed tomography (SPECT) imaging system, for example.

Figure 3:
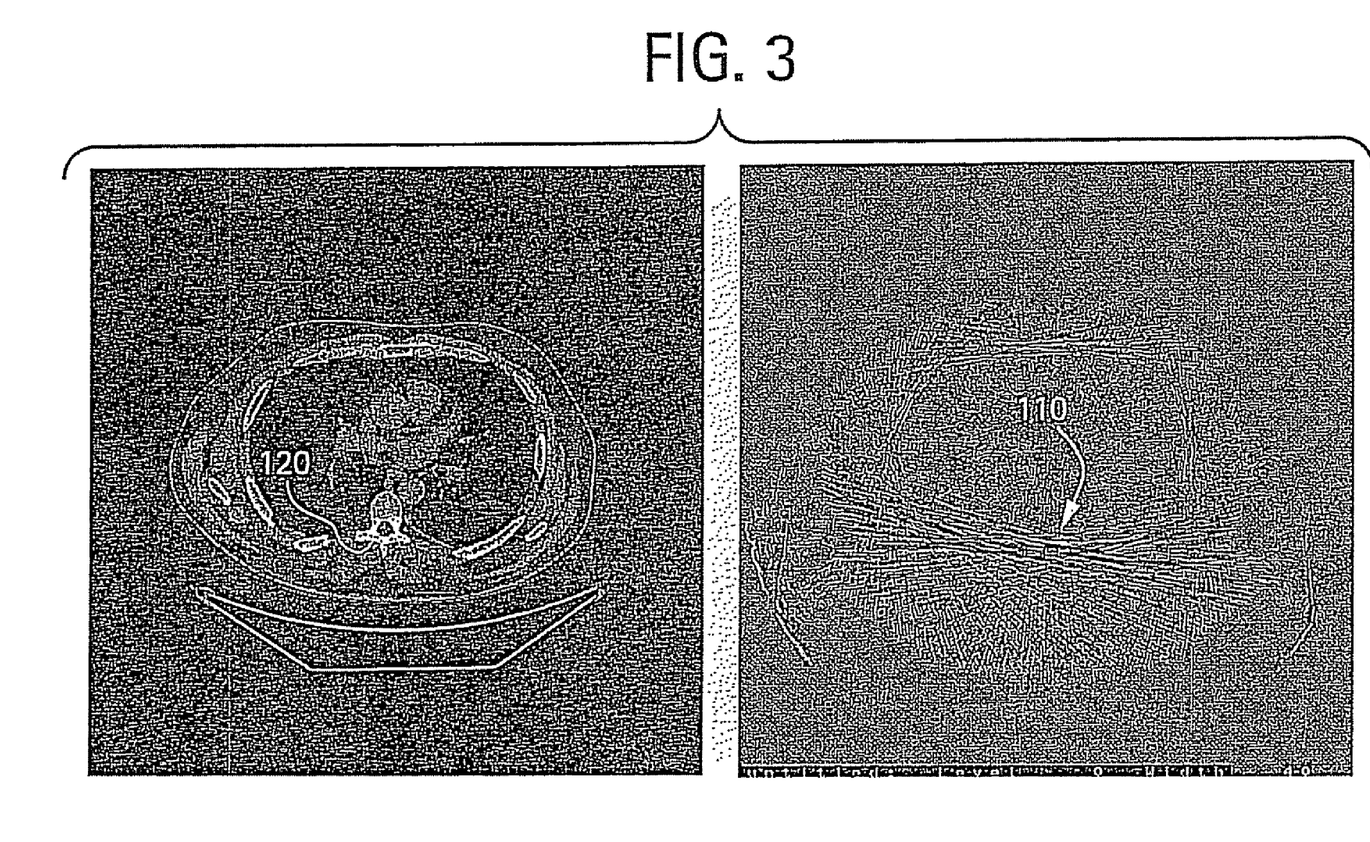
FIG. 3 depicts an exemplary CT image and a difference image in accordance with an embodiment of the invention.

In practice, reconstruction speed is reduced by the fact that some spatial regions of the reconstruction may converge faster than others. Refelling now to FIG. 3, an embodiment of a difference image is depicted. The image on the right shows the difference between a fifth iteration of a conventional ICD algorithm (shown on the left) and the final converged result. Notice that the difference is largest in certain regions, such as indicated by reference numeral 110, of the reconstruction corresponding to density edges and regions such as a spinal cord 120. It will be appreciated that this same effect exists for other IR reconstruction algorithms.

An embodiment will provide a process for performing non-homogeneous image element selection for ICD iterations in order to focus the computational resources on the regions of the reconstruction which converge most slowly. In an embodiment, the iterative, or non-homogeneous ICD algorithm (NH-ICD) dynamically selects the image elements that are in greatest need of updating, and applies greater computational resources to those image elements. As a result, the NH-ICD algorithm produces more rapid convergence and therefore reduces the overall computation time required for IR reconstruction.

Determining the PUC, which shall define the selection of specific image elements to be updated via application of the iterative algorithm, is the combination of two steps: first, a construction of an image element selection map (IESM) for selection of the image elements, corresponding to a relative ranking of all image elements with respect to the need to update them; and second, a selection of a particular schedule to use the IESM for image element updates.

The IESM may be constructed using a variety of criteria, described below:

In an embodiment, a history of response of image elements following application of a minimization algorithm, such as an absolute value of the change of the image element at a particular location, is used to form a 3D IESM. As used herein, the term "minimization algorithm" shall refer to an algorithm applied to the image elements for the purpose of reducing the cost function described above, and shall include, but not be limited to, the first algorithm and the iterative algorithm. In an embodiment, the IESM may be reduced to 2D by taking the mean absolute value of all updates, or minimization algorithm applications along the z axis 315, or the maximum absolute update value along z, for each (x,y) location. In an embodiment, the signed values of the updates are used.

The IESM formed by the values of the last change in the image elements can be noisy or sparse, while in reality regions of the reconstruction volume need to be updated. In an embodiment, the IESM can include low-pass filtering to recover some of the necessary information and improve the behavior of the minimization algorithm. In an exemplary embodiment, filtering with a 5×5 Hamming window may yield improved results.

In another embodiment, in addition to using the values of only the last change in the image element for the IESM, it is also possible to perform temporal filtering. Temporal filtering includes a weighted sum of two or more than two prior changes to a given image element following application of the minimization algorithm, to form the IESM. For example, the value of the average of the last 3 changes in a given image element location may be used to compute the IESM.

It will be appreciated that alternate techniques, other than the use of the history of response of image elements following application of the minimization algorithm can be used to establish the IESM. In an embodiment, the IESM is constructed by processing frequency information of the image volume prior to subsequent applications of the minimization algorithm. In another embodiment, a backprojection of a weighted error sinogram $wm(y_m - F_m(x))$ is used in order to form the IESM. The large magnitudes of the error sinogram correspond to regions of the reconstruction volume that have yet to converge. Therefore, a backprojection of the error sinogram yields an image of the regions of the volume which need to change to achieve convergence. In an embodiment, an unfiltered backprojection is used to form the IESM from the low-frequency information content in the error sinogram which maps to the smooth regions of the image volume most in need of updating. In another embodiment, a filtered backprojection is used to form the IESM with more emphasis on the high-frequency information in the error sinogram to identify the edges and noisy regions of the image volume that have yet to converge. In another embodiment a weighted backprojection is used to correct the IESM for geometrical distortions due to the data acquisition protocol such as cone-beam artifacts in multi-slice geometry, or helical artifacts in helical geometry. It will be appreciated that the invention will apply to backprojection algorithms which may include a combination of filtering and weighting algorithms. In yet another embodiment, the IESM is based partially on how many iterations have occurred since a pixel was last updated, that is, on how "recent" each pixel value is, thereby allowing for each pixel to be updated at some point.

In another embodiment, hybrid approaches using information from more than one of the criteria described above can be used to construct the IESM. For example, let $e(i,j)$ be the error image obtained from backprojection of the error sinogram, and let $u(i,j)$ be the (signed) selection map corresponding to the last changes in the image volume due to application of the minimization algorithm. In an example, the IESM may be constructed based on a weighted sum of both: $a*e(i,j)+b*u(i,j)$ where $a,b$ are scalars in $[0,1]$, and $a+b=1$. In an embodiment, $a,b$ may also change over time, and filtering maybe applied on top of this criteria.

While an embodiment of the invention has been described having a hybrid approach including a weighted combination of an error value and a change value, it will be appreciated that the scope of the invention is not so limited, and that the invention will also apply to reconstruction processes that may have hybrid approaches including more than two different values, such as three, four, or more different values, for example.

Subsequent to creating the IESM, it will be sorted based upon the magnitude of the criteria contained therein, as described above. Accordingly, in an embodiment, the sorting will facilitate the selection of the image elements to which the iterative algorithm will be applied. While the first algorithm visits all image elements once and once only per iteration, the iterative algorithm, applied to image elements selected via the sorted IESM will result in multiple updates at some image element locations, and fewer updates at some other image element locations, as will be described further below.

Following the construction of the IESM, it will be necessary to determine the frequency at which the IESM should be computed, and the schedule with which elements of the IESM will be visited, or subject to update via application of the iterative algorithm. As used herein, the term "update" shall indicate the application of the minimization algorithm, such as the first algorithm and the iterative algorithm, for example, to the referenced image element.

Accordingly, the schedule to determine an alternating application of the first (homogeneous) algorithm and the iterative (non-homogeneous) algorithm may be constructed using a variety of criteria, described below:

In an embodiment, each non-homogeneous step can include a number of sub-steps, applied to a set of image elements selected from the sorted IESM. In an embodiment, the number of sub-steps within the non-homogeneous step is defined by an iteration criteria. An example of the iteration criteria is one that defines the number of times that the iterative algorithm will be applied to the selected image, such as 5 times, for example. In an embodiment the IESM is re-processed, or updated, subsequent to the application, in each sub-step, of the iterative algorithm to the set of image elements. In an embodiment, each set of image elements selected is those elements that correspond to a specified percentile of the sorted IESM, as defined by a magnitude criteria. An example of the magnitude criteria is one that defines the selection of the top five percent of the magnitudes within the sorted IESM. In an embodiment, the iteration criteria and the magnitude criteria can vary independently.

In an embodiment, an alternative is to use a sequence of non-homogeneous sub-steps wherein a first number of sub-steps are applied to the top percentile of magnitudes within the sorted IESM, followed by a second number of sub-steps applied to the next percentile of the magnitudes within the sorted IESM. It will be appreciated that, in an embodiment, each number of sub-steps, as defined by one or more iteration criteria, can be independent. For example, it may be desired to apply the iterative algorithm to the top ten percent of elements within the sorted IESM 10 times, and to apply the iterative algorithm to the next ten percent 7 times. It will also be appreciated that, in an embodiment, each percentile of magnitudes, as defined by one or more magnitude criteria, may be independent. For example, it may be desired to apply the iterative algorithm to the top ten percent of elements within the sorted IESM 10 times, and to apply the iterative algorithm to the next seven percent of image elements within the sorted IESM 5 times.

While an embodiment has been described having two independent numbers of sub-steps applied to two independent sorted percentiles of the IESM, it will be appreciated that the scope of the invention is not so limited, and that the invention will also apply to reconstruction methods that may utilize other independent numbers of sub-steps applied to independent sorted percentiles of the IESM, such as three, four, or more, for example. Further, while an embodiment of the invention has been described having two independent sorted percentiles of the IESM that are adjacent and exclusive, it will be appreciated that the scope of the invention is not so limited, and that the invention will also apply to reconstruction methods that may have two or more independent sorted percentiles that may be inclusive, such as to apply the iterative algorithm to the image elements representing the 90th to 100th percentile within the sorted IESM 10 times, followed by application of the iterative algorithm to the image elements representing the 85th to 93rd percentile within the sorted IESM 6 times, for example.

In an embodiment, applications of the iterative algorithm, as defined above, may be interleaved with applications of the first algorithm. In an embodiment, the order of application of the first algorithm to the image elements is randomized over the reconstruction volume. In an embodiment, the order of application of the iterative algorithm to the selected image elements is randomized within the selection. In an embodiment, the number of image element updates in a non-homogeneous iteration may be different from that of a homogeneous iteration.

In an embodiment, the plurality of image elements is broken into subgroups, and the first algorithm is applied to the subgroups. In an embodiment, application of the first algorithm and application of the iterative algorithm are interleaved so that a partial iteration, such as for the subgroup, for each happens at a time. In an embodiment, a non-homogeneous step may alternate between several IESMs. For example, application of the iterative algorithm may utilize one IESM generated from the value of the last updates, and another generated from the backprojection of the error sinogram.

In an embodiment, the coordinate z will denote position along the axis of rotation 315 of the source 301 and detector array 302. In an embodiment, the ordered pair (x,y) is used to denote a position in a plane perpendicular to z. Accordingly, the coordinates (x,y,z) will define a location of an image element in three dimensional space. In an embodiment, it is computationally more efficient to update a group of all image elements in z at a specified location in (x,y). In an embodiment, the NH-ICD algorithm selects the location (x,y) to update based on the PUC, and then updates all image elements, as a group, for every z, at that (x,y) position.

Figure 4:
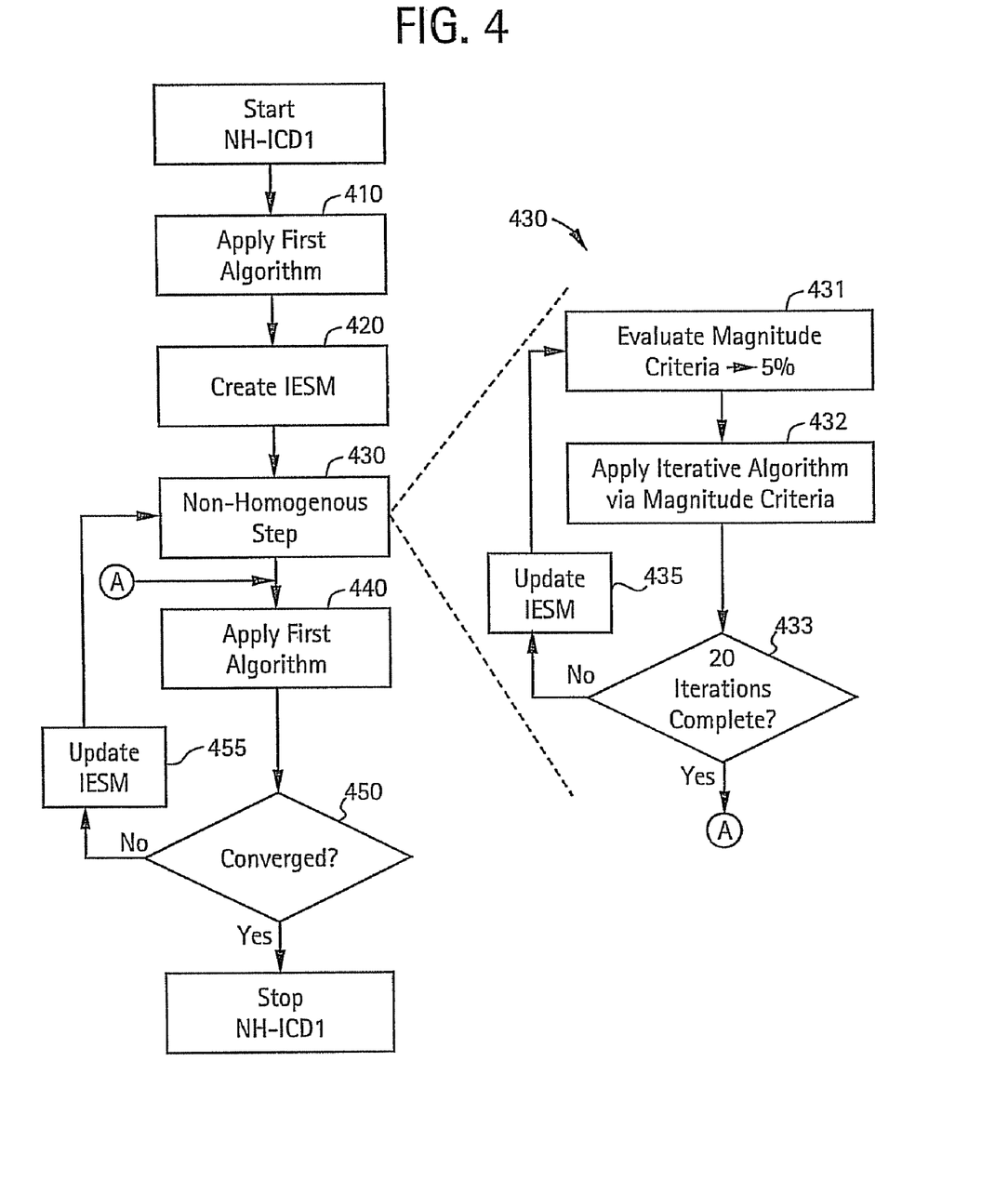
FIG. 4 depicts a flowchart of an exemplary reconstruction method in accordance with an embodiment of the invention.

Referring now to FIG. 4, an illustrative example of an embodiment of a reconstruction method, which shall be referred to as an NH-ICD1 process, is depicted. The NH-ICD1 process begins by applying 410 the first algorithm at every image element using random selection of the image elements. The process continues by processing the image data for creating 420 the IESM for each (x,y) position. In this example, the IESM is computed using the mean absolute value of the previous update of each group of image elements along z for the given (x,y) location.

The non-homogeneous step 430 begins with evaluating 431 the magnitude criteria. In this example, the magnitude criteria is specified as the top 5% of image elements within the IESM according to their mean absolute value. Accordingly, the iterative algorithm is applied 432 to the 5% of the image elements with the largest value within the IESM, in randomized order. Next, evaluating 433 the iteration criteria to determine if the non-homogeneous step is complete. In this example, the iteration criteria is 20 iterations. If the 20 iterations have not been completed, the IESM will be updated and sorted 435, and the iterative algorithm will again be applied 432 to the image elements in accordance with the magnitude criteria.

Following the completion of the number of iterations specified by the iteration criteria, the (homogeneous) first algorithm is applied 440 to each image element. This is followed by evaluating 450 a convergence criteria to determine if the plurality of image elements meet the desired level of convergence (as defined by the magnitude of the cost function, for example) has been achieved. If it has, the NH-ICD1 process is ended. If the desired level of convergence has not been achieved, the IESM is updated 455, and the non-homogenous step 430 is repeated. The update IESM step 455 may include one or more homogeneous iterations, or any of the methods disclosed herein. It will be appreciated that this alternating sequence of non-homogeneous and homogeneous steps is repeated until the desired level of convergence is achieved.

It will also be appreciated that FIG. 4 depicts an update of the IESM preceding each application of the iterative algorithm within the non-homogeneous sub-step. It will be further appreciated, that in this illustrated example, the iteration criteria (20 sub-iterations) and the magnitude criteria (top 5% of the sorted IESM) have been selected that each non-homogenous iteration will result in the application of the iterative algorithm to the same number (100%) of image elements as each application of the first algorithm. It will be appreciated that the above example is intended for illustration, and not limitation.

While an embodiment of the invention has been described including an update of the IESM preceding each application of the iterative algorithm, it will be appreciated that the scope of the invention is not so limited, and that the invention will also apply to reconstruction methods that may use other IESM update schedules, such as to update the IESM following every two, three, four, or more applications of the iterative algorithm, for example.

While an embodiment of the invention has been described having an iteration criteria of 20 sub-iterations, it will be appreciated that the scope of the invention is not so limited, and that the invention will also apply to reconstruction methods that may have an iteration criteria with any number of sub-iterations. While an embodiment of the invention has been described having a magnitude criteria of the top 5% of the sorted IESM, it will be appreciated that the scope of the invention is not so limited, and that the invention will also apply to reconstruction methods that may use any other appropriate magnitude criteria. While an embodiment of the invention has been described having a constant magnitude criteria and iteration criteria, it will be appreciated that the scope of the invention is not so limited, and that the invention will also apply to reconstruction methods that may one or both of a magnitude and an iteration criteria that are allowed to change, as may be appropriate.

Further, while an embodiment of the invention has been described including coordinated magnitude and iteration criteria such that each non-homogeneous iteration will result in the application of the iterative algorithm to the same number of image elements as the application of the first algorithm, it will be appreciated that the scope of the invention is not so limited, and that the invention will also apply to reconstruction methods that may use iteration and magnitude criteria that are not so coordinated.

Figure 5:
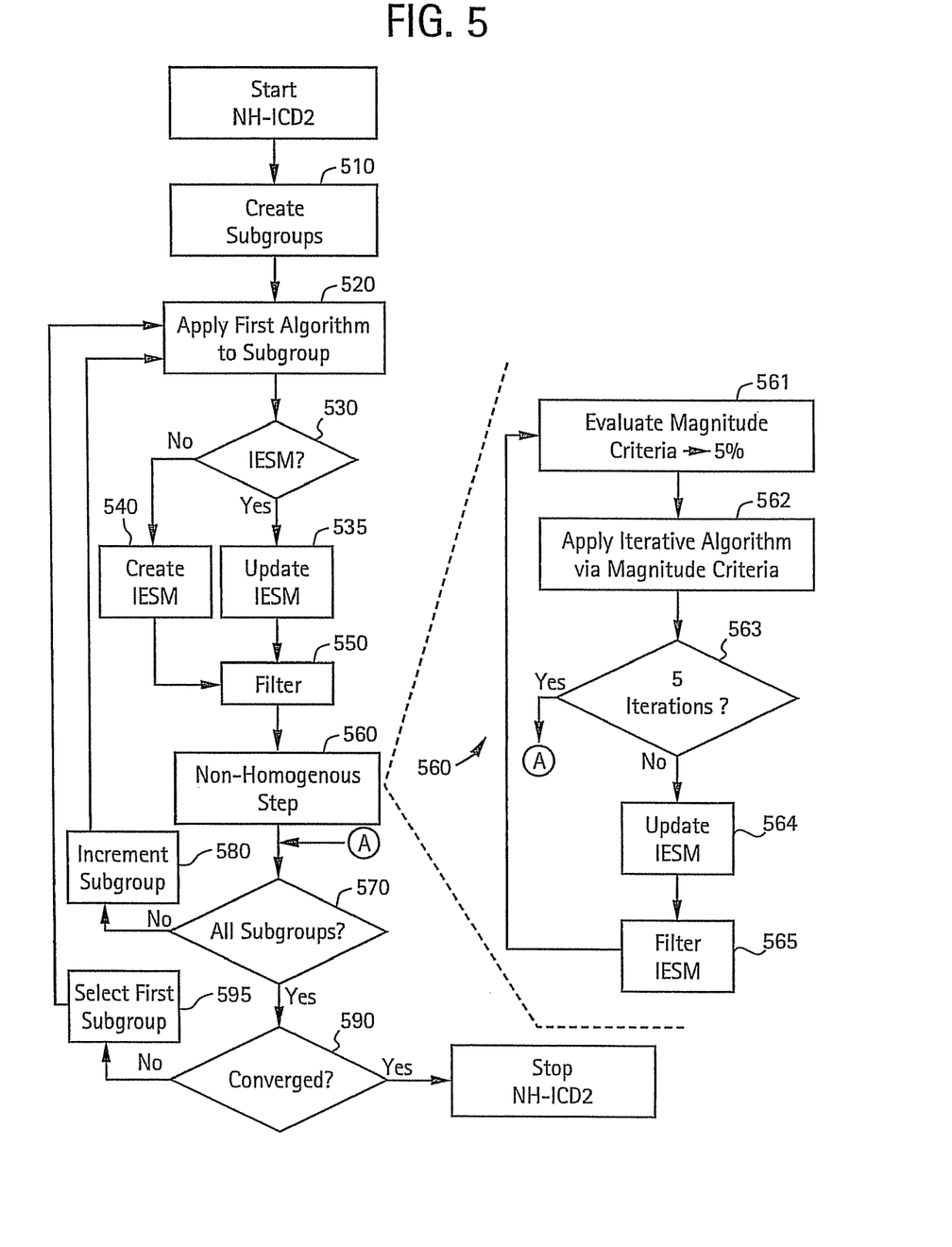
FIG. 5 depicts a flowchart of another exemplary reconstruction method in accordance with an embodiment of the invention.

Referring now to FIG. 5, another illustrative example of a reconstruction method, which shall be referred to as an NH-ICD2 process is depicted. The NH-ICD2 process includes interleaving smaller subgroups of homogeneous steps with non-homogeneous steps. In this example, the process begins with creating 510 four complementary subgroups from the 2D map of all image element locations. In an embodiment, the 2D map of all image element locations is broken down such that the neighbor of each image element is a member of a different subgroup. Next, a partial homogeneous iteration is performed by applying 520 the first algorithm to the image elements within the subgroup in random order. The process continues with determining 530 if the IESM currently exists. In response to determining 530 that the IESM does not currently exist, the process continues by processing the image data and creating 540 the IESM. In this example, the IESM is created by tracking the sum of the update magnitudes. The gaps within the IESM, corresponding to the image elements excluded from the subgroup, are filled by filtering 550 the IESM via a 5×5 Hamming window.

The non-homogeneous step 560 begins with evaluating 561 the magnitude criteria. In this example, the magnitude criteria is specified as the top 5% of the image elements according to the sum of the update magnitudes. Accordingly, the iterative algorithm is applied to the 5% of the image elements with the largest value within the ESM, in randomized order according to the magnitude criteria. Next, evaluating 563 the iteration criteria to determine if the non-homogeneous step is complete. In this example, the iteration criteria is 5 iterations. If the 5 iterations have not been completed, the IESM will be updated 564, filtered 565, and the iterative algorithm will again be applied 562 to the image elements in accordance with the magnitude criteria.

Following the completion of the number of iterations specified by the iteration criteria, is determining 570 if the first algorithm has been applied to all of the subgroups. In response to determining that the first algorithm has not been applied to all of the subgroups, the process includes incrementing 580 the subgroup, in accordance with an increment criteria, such that the first algorithm is applied 520 to the next subgroup of the set of subgroups. Following the determination 530 that the IESM currently exists, the IESM is updated 535 and filtered 550. The process then proceeds with the non-homogenous step 560 as described above. Following determining 570 that the first algorithm has been applied to all of the subgroups, is evaluating 590 the convergence criteria to determine if the desired level of convergence (as defined by the magnitude of the cost function, for example) has been achieved. If it has, the NH-ICD2 process is ended. If the desired level of convergence has not been achieved, the first subgroup is selected 595, and the first algorithm is applied 520. It will be appreciated that this alternating sequence of non-homogeneous and incrementing homogeneous subgroup steps is repeated until the desired level of convergence is achieved. It will be appreciated that in this illustrated example, the iteration criteria (5 sub-iterations) and the magnitude criteria (top 5% of the IESM) have been selected that each non-homogenous iteration will result in the application of the iterative algorithm to the same number (25%) of image elements as each application of the first algorithm to the sub-group. It will be appreciated that the above example is intended for illustration, and not limitation.

While an embodiment of the invention has been described having four subgroups of image elements and five sub-iterations, it will be appreciated that the scope of the invention is not so limited, and that the invention will apply to reconstruction methods that may have other numbers of subgroups, such as two, three, five, or more, and other numbers of sub-iterations, such as one, two, three, four, six, or more, for example. Further, while an embodiment of the invention has been described having a Hamming 5×5 window to filter and fill in missing information, it will be appreciated that the scope of the invention is not so limited, and that the invention will also apply to reconstruction methods that may use other appropriate filtering or interpolation techniques such as a Gaussian, Hann or Blackman window, or cubic splines or other interpolation kernels, for example, and other appropriate window sizes such as 3×3 or 7×7, for example. It will also be appreciated that the image filtering and interpolation may be applied in three dimensions as well as in two dimensions.

Another illustrative example of an embodiment of a reconstruction method is an NH-ICD3 process, which is identical to the NH-ICD1 algorithm, except that the IESM is computed from an un-weighted, un-filtered backprojection of the error sinogram at the beginning of each sub-step. In an embodiment, the IESM is a 2D slice of x,y information grouped to includes all values of z, while the sinogram data corresponds to a 3D volume of x,y,z information. In a helical cone-beam geometry, the error sinogram contains multiple views (as may result from more or less than one rotation of the gantry 310) and multiple detector 302 rows arranged along the z axis 315 (cone-beam). In an embodiment, the 3D error sinogram is first collapsed into a 2D error sinogram by taking a maximum intensity projection (MIP) through all of the rows, that is, for each view, for each channel, the maximum value of the channel across all rows is retained. Next, the sinogram with multiple views is collapsed to a single rotation of data by averaging all the views at the same projection angle. This forms a 2D error sinogram with one rotation of data, one row, and all the channels. This error sinogram is then backprojected directly in the fan-beam geometry to form the IESM. NH-ICD3 then uses the IESM in a similar fashion as described for NH-ICD1.

It will be appreciated that the above example is intended for illustration, and not limitation.

In an embodiment, a special case of non-homogeneous processing may be referred to as zero-slipping. A common variation in the reconstruction model is to define and enforce a positivity constraint on the reconstructed image volume to prevent image elements that have values less than zero, since physical attenuation coefficients are positive. The model of equation (2) then becomes:

$$\hat{x} = \operatorname*{argmin}_{x>=0}\left\{\sum_{m=0}^{M} w_m|y_m - F_m(x)|^2 + S(x)\right\} \quad \text{equation-3}$$

where the image estimate $\hat{x}$ is positive. This condition typically forces image elements that do not meet the positivity constraint, that is, are located outside of the object, or in the air around the object, to have an attenuation coefficient of zero. Following application of the positivity constraint to an image element, it is unlikely that the value of the image element will need to subsequently change. Accordingly, image elements that are zero and are adjacent to elements with zero values are generally in the air surrounding the object to be reconstructed, and do not require additional iterations to converge. In an embodiment, the IESM is established such that image elements that are zero, and are adjacent to image elements that are zero have the smallest magnitude within the sorted IESM. Accordingly these image elements are never selected for updating during non-homogeneous and homogeneous updates, so that time is better spent on those pixels in real need of updating, ultimately resulting in faster convergence for a given amount of processing time.

Figure 6:
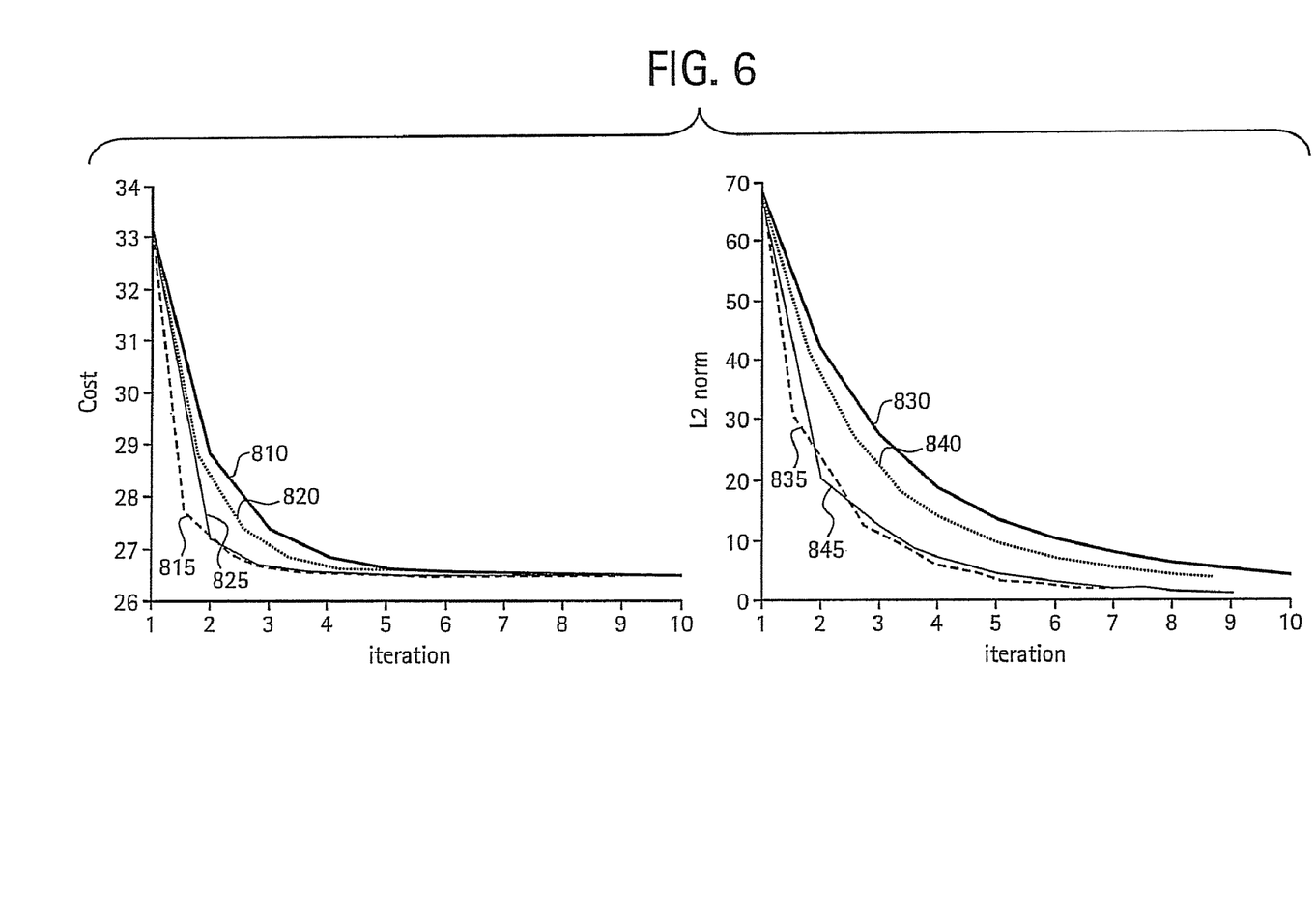
FIG. 6 depicts a set of charts depicting performance of reconstruction methods in accordance with an embodiment of the invention.

Referring now to FIG. 6, the improvement provided by use of the foregoing reconstruction methods disclosed herein is depicted. Each plot shows the convergence for each of four algorithms: conventional homogeneous ICD 810, 830, homogeneous ICD with zero skipping 820, 840, non-homogeneous ICD with individual image element selection 815, 835, and non-homogeneous ICD with full group updates along all elements in z for a fixed (x,y) position 825, 845. The plot on the left depicts the reduction in the cost function of equation (3), and the plot on the right shows the reduction in the root mean squared error between the depicted IR solution and the solution that would be reached with many iterations of any convergent IR algorithm. In both cases, the number of iterations is determined by the computation time divided by the time required for a full conventional ICD iteration. It will be appreciated that in both cases the non-homogeneous ICD algorithm 815, 825, 835, 845 is much faster than the conventional algorithm 810, 820, 830, 840. It will also be appreciated that merely the simple zero-skipping method of selecting the set of image elements that meet the positivity constraint 820, 840 substantially reduces computation time and resources as compared with conventional homogenous ICD 810, 830. It is important that the NH-ICD) algorithms 815, 825, 835, 845, both with individual image element selection in 3D 815, 835, and with single selection for the group of elements along z 825, 845, have similar computation reduction, and therefore, yield improved results.

Figure 7:
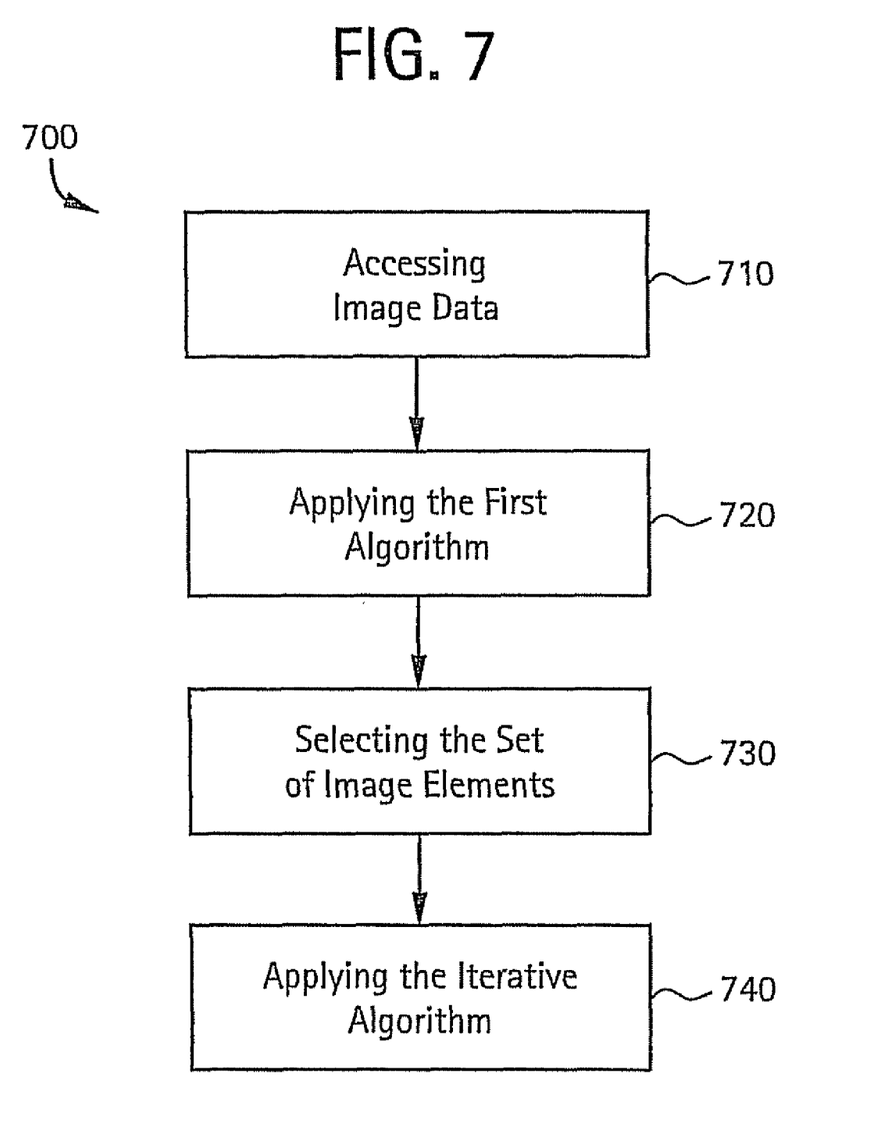
FIG. 7 depicts a flowchart of a generalized exemplary reconstruction method in accordance with an embodiment of the invention.

In view of the foregoing, and with reference to FIG. 7, a flowchart 700 of a generalized embodiment of a method for reconstructing an image 361 of an object 320, the image 361 comprising a plurality of image elements, is depicted.

In an embodiment, the method begins with accessing 710 image data associated with the plurality of image elements, and proceeds by applying 720 the first algorithm to the plurality of image elements, selecting 730 the spatially non-homogenous set of the plurality of image elements, and applying 740 the iterative algorithm to the set of image elements to reduce the amount of time necessary for reconstructing the image using the ICD algorithm, or to improve an image quality at a fixed computation time, or both.

In an embodiment, the applying the first algorithm includes at least one of an ordered subsets algorithm, such as a penalized weighted least squares ordered subsets algorithm for example, a conjugate gradient algorithm, and a homogeneous iterative coordinate descent algorithm. In an embodiment, the applying the iterative algorithm comprises applying the non-homogeneous iterative coordinate descent (NH-ICD) algorithm.

While an embodiment of the invention has been described using at least one of a penalized weighted least squares ordered subsets algorithm, a conjugate gradient algorithm, a homogeneous iterative coordinate descent algorithm, and a non-homogeneous iterative coordinate descent algorithm, it will be appreciated that the scope of the invention is not so limited, and that the invention will also apply to reconstruction methods that may utilize other appropriate algorithms.

In an embodiment, the method further includes processing the image data via the image reconstructor 375 in response to the controller 370, to create the IESM including the plurality of magnitudes associated with the plurality of image elements and reprocessing the image data to update the IESM subsequent to the applying the minimization algorithm. In an embodiment, the IESM is created and updated with respect to at least one of the history of response of the plurality of image elements to the applying the minimization algorithm, frequency information associated with the image data preceding one of the applying the minimization algorithm, a back-projection of the error sinogram, and how recently each pixel was last updated. In an embodiment, the processing of the image data to create the IESM further includes sorting the IESM according to the plurality of magnitudes within the IESM and the updated IESM, respectively, such that the set of image elements will be selected corresponding to the sorted image element selection map. Subsequent to the processing the IESM, an embodiment further includes applying the iterative algorithm to the set of updated image elements.

In an embodiment, the sorting the plurality of magnitudes via the image reconstructor 375 in response to the controller 370, within the image element selection map relating to the history of response of the plurality of image elements is based upon at least one of: an absolute value of change resulting from a previous application of the minimization algorithm; low-pass filtering a value of a change resulting from a previous application of the minimization algorithm, and a value of change related to more than two previous applications of the minimization algorithm.

In an embodiment, the method further includes defining the convergence criteria, the magnitude criteria, and the iteration criteria. In an embodiment, the convergence criteria will define a reconstruction level to determine whether the image data has been satisfactorily reconstructed into the image 361 of the object 320. That is, application of the first algorithm will be determined to be necessary in response to determining that the plurality of image elements do not meet the convergence criteria. Accordingly, the image reconstructor 375 is receptive of the convergence criteria, and the applying the first algorithm, via the image reconstructor 375, and further implementation of the reconstruction method, occurs in response to determining that the plurality of image elements do not meet the convergence criteria. In an embodiment the magnitude criteria will define the appropriate magnitude of image elements corresponding to the sorted plurality of magnitudes within the ESM to select as the set of image elements to which the iterative algorithm shall be applied. In an embodiment, an example of the magnitude criteria is the top five percent of the sorted IESM. In an embodiment, the iteration criteria will define a number of sub-steps for applying the iterative algorithm to the image data, such that the iterative algorithm will be repetitively applied via the image reconstructor 375 to the set of image elements in response to determining that the defined iteration criteria has not been met.

An embodiment further includes separating the plurality of image elements, via the image reconstructor 375 in response to the controller 370, into the set of subgroups, selecting one of the subgroups such that the first algorithm is applied to the selected subgroup of the set of subgroups. In an embodiment, the processing and the reprocessing of the IESM further include filtering to develop, or interpolate data that is not included within the selected subgroup. An embodiment further includes choosing an increment criteria to define the subgroup of the set of subgroups to which to apply the first algorithm.

An embodiment of the invention further includes selecting the spatially non-homogeneous set of groups of the plurality of image elements via the image reconstructor 375 in response to the controller 370. Another embodiment includes the set of groups aligned along the z axis 315, or with the helical scan direction. An embodiment of the invention includes defining the positivity constraint to identify image elements disposed outside of the object, and selecting, via the image reconstructor 375, the spatially non-homogeneous set of the plurality of image elements that meet the positivity constraint.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to reduce computational time required to reconstruct an image from image data.

As disclosed, some embodiments of the invention may include some of the following advantages: to reduce required computation resources and time by reducing the number of iterations required to achieve satisfactory image quality; and to increase image quality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for reconstructing an image of an object, the image comprising a plurality of image elements, the method comprising:
   accessing image data associated with the plurality of image elements;
   applying a first algorithm to the plurality of image elements;
   selecting a spatially non-homogenous set of the plurality of image elements; and
   applying an iterative algorithm to the set of image elements to reduce an amount of time necessary for reconstructing the image, or to improve an image quality at a fixed computation time, or both.

2. The method of claim 1, wherein the applying the first algorithm comprises at least one of:
   applying an ordered subsets algorithm;
   applying a filtered backprojection algorithm;
   applying a conjugate gradient algorithm; and
   applying a homogeneous iterative coordinate descent algorithm.

3. The method of claim 1, wherein the applying the iterative algorithm comprises:
   applying a non-homogeneous iterative coordinate descent algorithm.

4. The method of claim 1, wherein:
   the applying the first algorithm is in response to determining that the plurality of image elements do not meet a convergence criteria.

5. The method of claim 1, further comprising:
   processing the image data to create an image element selection map, the selection map comprising a plurality of magnitudes associated with the plurality of image elements, the processing comprising at least one of the following:
      processing the image data based upon a history of response of the plurality of image elements to at least one of the applying the first algorithm, and the applying the iterative algorithm;
      processing the image data based upon frequency information associated with the image data preceding at least one of the applying the first algorithm, and the applying the iterative algorithm;
      processing the image data based upon a backprojection of the error sinogram; and
      processing the image data based upon how recently each pixel was last updated;
   sorting the plurality of magnitudes within the image element selection map;
   wherein the selecting comprises selecting the set of image elements corresponding to the sorted image element selection map.

6. The method of claim 5, wherein the sorting the plurality of magnitudes comprises at least one of:
   sorting the plurality of magnitudes, relating to the processing the image data based upon the history of response of the plurality of image elements, based upon an absolute value of change resulting from a previous application of one of the first algorithm and the iterative algorithm;
   sorting the plurality of magnitudes, relating to the processing the image data based upon the history of response of the plurality of image elements, based upon low-pass filtering a value of a change resulting from a previous application of one of the first algorithm and the iterative algorithm; and
   sorting the plurality of magnitudes, relating to the processing the image data based upon the history of response of the plurality of image elements, based upon a value of change related to more than two previous applications of one of the first algorithm and the iterative algorithm.

7. The method of claim 5, wherein:
   the selecting comprises selecting the set of image elements corresponding to the sorted plurality of magnitudes in accordance with a defined magnitude criteria.

8. The method of claim 7, wherein:
   the applying the iterative algorithm to the set of image elements is in response to determining that an iteration criteria has not been met.

9. The method of claim 8, further comprising:
   separating the plurality of image elements into a set of subgroups; and
   selecting a subgroup of the set of subgroups;
   wherein the applying the first algorithm comprises applying the first algorithm to the selected subgroup of the set of subgroups; and
   wherein the processing comprises filtering to make available data not within the subgroup.

10. The method of claim 1, wherein the selecting the set of the plurality of image elements comprises:
    selecting a spatially non-homogeneous set of groups of the plurality of image elements.

11. The method of claim 10, wherein the selecting the set of groups of the plurality of image elements comprises:
    selecting a set of groups of the plurality of image elements aligned along a z axis.

12. The method of claim 1, further comprising:
    defining a positivity constraint to identify image elements disposed within the object;
    wherein the selecting comprises selecting the spatially non-homogenous set of the plurality of image elements that meet the positivity constraint.

13. A program storage device readable by a computer, the device embodying a program or instructions executable by the computer to perform the method of claim 1.

14. An imaging system comprising:
    a controller;
    a source in signal communication with the controller, the source generating imaging energy in response to a control signal from the controller;
    a detector array configured to receive the imaging energy and make available image data in response thereto;
    a translating table configured for receiving an object thereon and operable to translate in relation to the source and the detector array; and an image reconstructor electrically coupled to the detector array and the controller, the image reconstructor responsive to the controller and receptive of the image data to reconstruct an image comprising a plurality of image elements via a technique comprising the application of a first algorithm to the plurality of image elements, selection of a spatially non-homogenous set of the plurality of image elements, and application of an iterative algorithm to the set of image elements to reduce an amount of time necessary for reconstructing the image.

15. The system of claim 14, wherein:
the iterative algorithm comprises a non-homogenous iterative coordinate descent algorithm; and
the first algorithm comprises at least one of a penalized weighted least squared ordered subsets, a conjugate gradient algorithm, and a homogenous iterative coordinate descent algorithm.

16. The system of claim 14, wherein:
the image reconstructor is receptive of a convergence criteria; and
the image reconstructor applies the first algorithm in response to determining that the plurality of image elements do not meet the convergence criteria.

17. The system of claim 14, wherein:
the image reconstructor is responsive to the controller to process the image data to create an image element selection map, the selection map comprising a plurality of magnitudes associated with the plurality of image elements, via at least one of the following:
   a history of response of the plurality of image elements to the application of at least one of the first algorithm and the iterative algorithm;
   frequency information associated with the image data preceding the application of at least one of the first algorithm and the iterative algorithm;
   a backprojection of the error sinogram;
   a weighted backprojection of the error sinogram; and
   a filtered backprojection of the error sinogram; and
the image reconstructor is responsive to the controller to sort the plurality of magnitudes within the image element selection map and select the set of image elements corresponding to the sorted image element selection map.

18. The system of claim 17, wherein:
the image reconstructor is responsive to the controller to sort the plurality of magnitudes within the image element selection map relating to the history of response of the plurality of image elements via at least one of:
   an absolute value of change resulting from a previous application of one of the first algorithm and the iterative algorithm;
   application of a low-pass filter to a value of a change resulting from a previous application of one of the first algorithm and the iterative algorithm; and
   a value of change related to more than two previous applications of one of the first algorithm and the iterative algorithm;
wherein the image reconstructor selects the set of image elements corresponding to the sorted plurality of magnitudes in accordance with a defined magnitude criteria.

19. The system of claim 18, wherein:
the image reconstructor applies the iterative algorithm to the set of image elements in response to determining that an iteration criteria has not been met.

20. The system of claim 19, wherein:
the image reconstructor is responsive to the controller to separate the plurality of image elements into a set of subgroups, apply the first algorithm to a subgroup of the set of subgroups, and to apply filtering to the image element selection map to make available data not within the subgroup.

21. The system of claim 14, wherein:
the image reconstructor is responsive to the controller to select a set of groups of the plurality of image elements aligned along a z axis.

22. The system of claim 14, wherein:
wherein the image reconstructor is receptive of a positivity constraint to identify image elements disposed within the object, and selects the spatially non-homogenous set of the plurality of image elements that meet the positivity constraint.

23. The system of claim 14, wherein:
the imaging system comprises a computed tomography (CT) imaging system.

* * * * *